(12) United States Patent
Chen et al.

(10) Patent No.: US 8,937,824 B2
(45) Date of Patent: Jan. 20, 2015

(54) PHOTOVOLTAIC SYSTEM AND METHOD OF CONTROLLING SAME

(71) Applicant: Eaton Corporation, Cleveland, OH (US)

(72) Inventors: Jih-Sheng Chen, Taipei (TW); Hung-Kuang Chen, Taipei (TW); Jung-Hua Weng, Taipei (TW)

(73) Assignee: Eaton Corporation, Cleveland, OH (US)

( * ) Notice: Subject to any disclaimer, the term of this patent is extended or adjusted under 35 U.S.C. 154(b) by 77 days.

(21) Appl. No.: 13/751,220

(22) Filed: Jan. 28, 2013

(65) Prior Publication Data

US 2014/0211530 A1    Jul. 31, 2014

(51) Int. Cl.
*H02H 7/122*  (2006.01)
*H02M 7/5387*  (2007.01)
*H02J 3/38*  (2006.01)
*H02M 7/48*  (2006.01)
*H02M 1/00*  (2006.01)

(52) U.S. Cl.
CPC ............ *H02M 7/53871* (2013.01); *H02J 3/383* (2013.01); *H02M 7/48* (2013.01); *H02M 2001/007* (2013.01)
USPC ......................................... 363/56.02; 363/132

(58) Field of Classification Search
USPC ............... 363/50, 55, 56.01, 56.02, 123, 131, 363/132, 142
See application file for complete search history.

(56) References Cited

U.S. PATENT DOCUMENTS

| | | | | |
|---|---|---|---|---|
| 4,377,842 | A * | 3/1983 | Cambier | 363/20 |
| 7,599,196 | B2 * | 10/2009 | Alexander | 363/13 |
| 7,929,325 | B2 * | 4/2011 | de Rooij et al. | 363/71 |
| 8,018,748 | B2 * | 9/2011 | Leonard | 363/95 |
| 8,330,299 | B2 * | 12/2012 | Steigerwald et al. | 307/140 |
| 2010/0301676 | A1 * | 12/2010 | Hernandez et al. | 307/82 |
| 2012/0051101 | A1 * | 3/2012 | El-Barbari et al. | 363/49 |
| 2013/0343099 | A1 * | 12/2013 | Eom et al. | 363/21.12 |
| 2014/0001864 | A1 * | 1/2014 | Nirantare et al. | 307/71 |

FOREIGN PATENT DOCUMENTS

| | | |
|---|---|---|
| CN | 201699453 U | 1/2011 |
| EP | 2362519 A2 | 8/2011 |

* cited by examiner

*Primary Examiner* — Adolf Berhane
(74) *Attorney, Agent, or Firm* — Ziolkowski Patent Solutions Group, SC (57) ABSTRACT

A photovoltaic (PV) system is disclosed that provides dynamic regulation of the output of a PV array such that the inverter can safely operate without entering a voltage protection mode. The PV system includes a PV array that generates a direct current (DC) output from received solar radiation and a DC link coupled to the PV array to receive the DC output therefrom. The PV system also includes a DC-to-AC power inverter electrically coupled to the DC link to receive the DC output therefrom and invert the DC output to an AC output and a damping circuit electrically coupled to the DC link and positioned between the PV array and the DC-to-AC power inverter. The damping circuit includes a damping resistor and a damping switch.

22 Claims, 9 Drawing Sheets

PHOTOVOLTAIC SYSTEM AND METHOD OF CONTROLLING SAME

BACKGROUND OF THE INVENTION

Embodiments of the invention relate generally to electronic power conversion and, more particularly, to a photovoltaic system and method of controlling thereof that monitors and regulates the output voltage of a photovoltaic array to be within a desired voltage range for operating the photovoltaic inverter.

Photovoltaic (PV) power systems are power systems that employ a plurality of solar modules to convert sunlight into electricity. PV systems include multiple components, including PV modules, mechanical and electrical connections and mountings, and means of regulating or modifying the electrical output. One common arrangement in PV systems is for several PV modules to be connected in series to form a PV string, with multiple PV strings in a PV system then being combined in parallel to aggregate the current in a PV array.

In operation, PV modules generate direct current (DC) power, with the level of DC current being dependent on solar radiation and the level of DC voltage dependent on temperature. When alternating current (AC) power is desired, an inverter is used to convert the DC energy into AC energy, such as AC energy suitable for transfer to a power grid.

For converting the varying DC voltage of a PV array to the fixed frequency AC voltage of the power grid, PV inverters may employ a single-stage conversion power circuit in which a transformer is employed to boost the AC voltage. Alternately, PV inverters may employ a two-stage conversion power circuit that uses a DC link as an intermediate energy storage step, which means that the converter first converts the unstable PV array voltage to a stable DC voltage. In a two-stage PV inverter, often the first stage includes a boost converter, and the second stage includes a single-phase or three-phase inverter system. The PV inverter then subsequently converts the stable voltage into an AC current that can be injected into the grid.

The open voltage (Voc) and maximum power (Pmax) of a photovoltaic cell is dependent upon the ambient temperature. In particular, Voc and Pmax increase as the ambient temperature decreases from 25 degrees Celsius. Accordingly, the voltage-power curve of a PV array panel varies in both power and voltage as the ambient temperature of the PV array decreases.

If the PV array voltage is below a threshold, the boost converter operates to boost the PV voltage output from the PV array. If the PV array voltage is above the threshold, the boost circuit will stop switching and allow the PV voltage to pass through the diode to the bus capacitors and DC/AC circuit. As the PV array voltage continues to increase above the threshold, the operating temperature of the PV inverter also increases. Due to the high temperature and voltage protection integrated into the PV inverter, the PV inverter enters a voltage protection mode in which it regulates its output power and/or shuts down inverter operation in order to prevent the inverter from overheating or failing. While the voltage protection mode extends the life of the PV inverter, it also negatively affects the operating efficiency of the PV inverter.

It would therefore be desirable to provide a PV system wherein the PV inverter would be capable of operating at high PV array voltages without entering a voltage protection mode.

BRIEF DESCRIPTION OF THE INVENTION

The present invention provides a system and method for controlling the DC voltage provided to an inverter by a photovoltaic array. A control strategy is set forth that provides for dynamic regulation of the operating voltage of the photovoltaic array such that the inverter can safely operate without entering a voltage protection mode.

In accordance with one aspect of the invention, a photovoltaic (PV) system includes a PV array configured to generate a direct current (DC) output from received solar radiation and a DC link coupled to the PV array to receive the DC output therefrom. The PV system also includes a DC-to-AC power inverter electrically coupled to the DC link to receive the DC output therefrom and invert the DC output to an AC output and a damping circuit electrically coupled to the DC link and positioned between the PV array and the DC-to-AC power inverter. The damping circuit includes a damping resistor and a damping switch.

In accordance with another aspect of the invention, a method of operating a photovoltaic (PV) system includes monitoring an output voltage of a PV array and determining whether the monitored output voltage of the PV array is above the maximum operating voltage of a PV inverter. If the monitored output voltage of the PV array is above the maximum operating voltage of the PV inverter, the method includes the steps of: activating a damping circuit to reduce the output voltage of the PV array to a first predetermined threshold, the damping circuit comprising a damping resistor and a damping switch; and determining whether the monitored output voltage of the PV array is below the first predetermined threshold. If the monitored output voltage of the PV array is below the first predetermined threshold, the method includes the step of deactivating the damping circuit.

In accordance with yet another aspect of the invention, a photovoltaic (PV) system includes a PV inverter, a DC link electrically coupled to the PV inverter and configured to operate at a DC link voltage, and a PV array connected to the DC link. The PV system also includes a damping circuit coupled between the PV array and the PV inverter. The damping circuit includes a damping resistor and a damping switch. Further, the PV system includes a controller programmed to monitor an output voltage of the PV array; and selectively operate the damping switch based on the monitored output voltage of the PV array.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The embodiments of the invention set forth herein relate to a system and method for controlling a voltage from a PV array received by a PV inverter. A PV system is provided that includes one or more PV arrays configured to generate a direct current (DC). A DC-to-AC power inverter is electrically coupled to the PV array(s) to receive the DC output therefrom and invert the DC output to an AC output. A damping circuit is provided to absorb surplus power generated by the PV array(s) and drag down the voltage output from the PV array to within a safe margin for DC/AC operation of the inverter.

Figure 1:
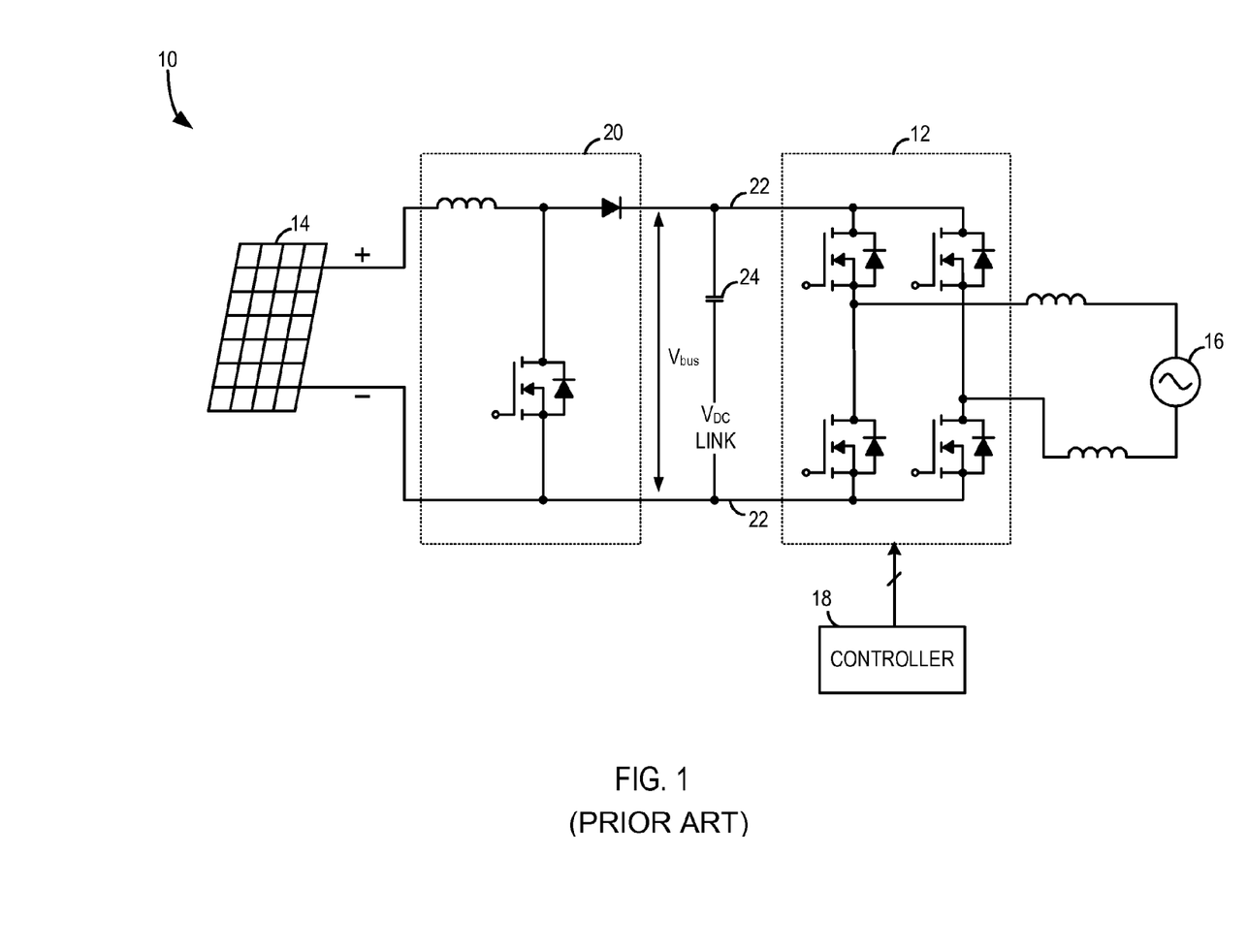
FIG. 1 is a schematic illustration of a prior art photovoltaic system.

The general structure of a PV system 10 that is known in the art is shown in FIG. 1. PV system 10 includes a PV inverter 12 coupled to a PV array 14 to convert a varying DC voltage from the PV array 14 to a fixed frequency AC current for a power grid 16. In one embodiment, PV array 14 is composed of a plurality of PV strings (not shown) connected in parallel, with each of the PV strings including a plurality of modules (not shown) therein that are connected in series to generate a DC power from received solar radiation. An inverter controller 18 associated with PV inverter 12 functions to control switching of the plurality of switches in the PV inverter 12 in order to output a desired AC power to power grid 16. A boost circuit 20 is provided to convert the output voltage of the PV array 14 to a DC bus voltage. A DC link 22, including a DC link capacitor 24, couples PV array 14 to PV inverter 12.

Figure 2:
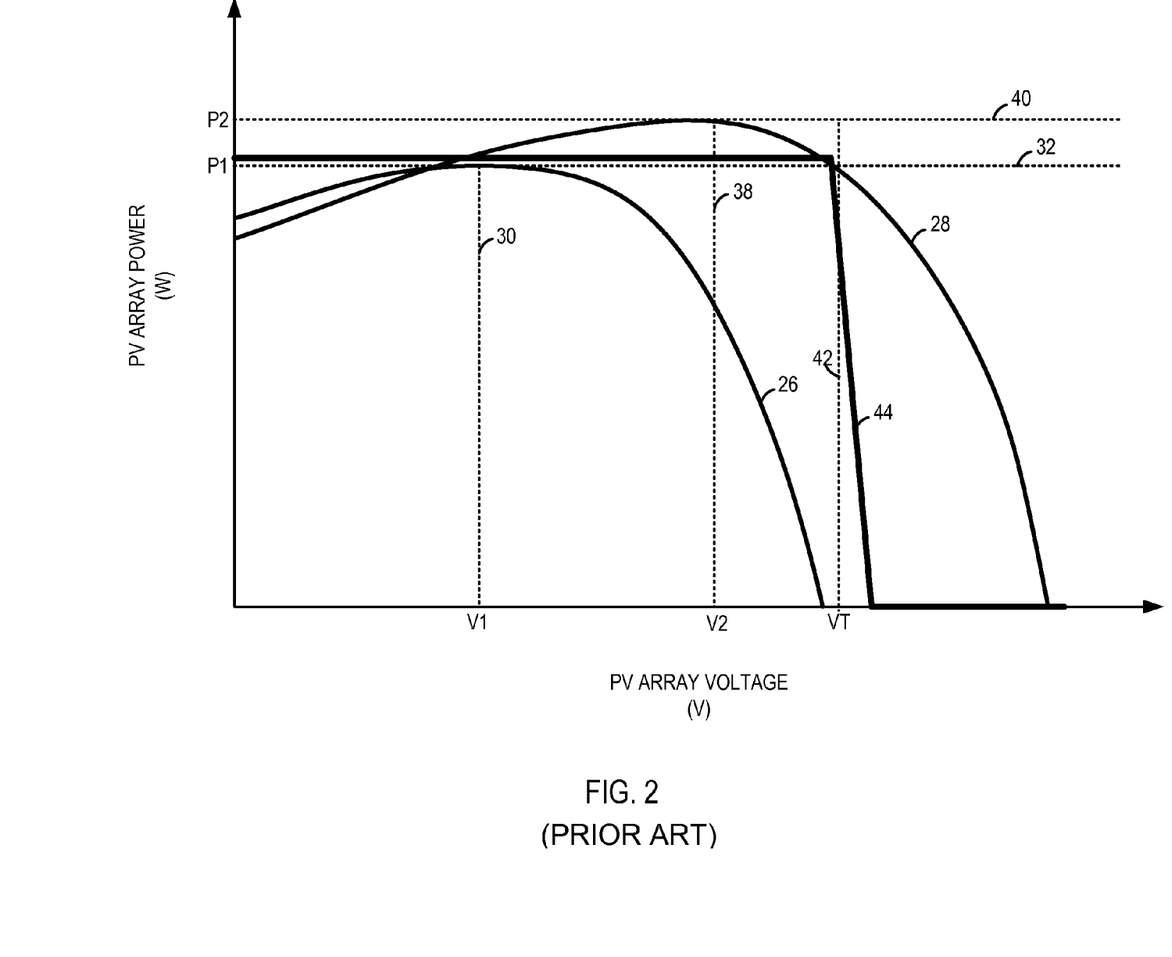
FIG. 2 is a graph illustrating the effect of a temperature change on the operating voltage and output power of a photovoltaic array of the photovoltaic system of FIG. 1.

FIG. 2 is a graph illustrating operating characteristics of a PV array or string, such as PV array 14 of FIG. 1, as described by a pair of power v. voltage curves 26, 28. Curve 26 illustrates the power v. voltage curve at a normal, baseline operating temperature (e.g., 25 degrees Celsius). Curve 28 illustrates the power v. voltage curve at a lower operating temperature (e.g., 0 degrees Celsius). Referring first to curve 26, PV array 14 operates to output a panel power (W), as indicated along the y-axis, as a function of its array voltage (V), indicated along the x-axis. At a certain optimal operation voltage, V1, indicated by dashed line 30, PV array outputs a maximum array power, P1, indicated at 32. Thus, in order to maximize production/output of PV array, it is desirable to operate PV array 14 at its optimal operation voltage V1 so as to achieve maximum power extraction.

Referring now to curve 28, when the ambient temperature around PV array 14 decreases, the power output of PV array 14 increases. Thus, the optimal operation voltage of PV array 14 likewise increases to an optimal operation voltage, V2, indicated by dashed line 38. At optimal operation voltage V2, the PV array 14 outputs a maximum panel power, P2, indicated at dashed line 40.

Due to the high voltage protection of PV inverter 12, PV inverter controller 18 is programmed regulate the output power of PV inverter 12 when the operation voltage of PV array 14 exceeds a maximum operating voltage threshold, $V_{INV\_MAX}$, for PV inverter 12 as indicated by dashed line 42. This regulation of output power, illustrated by the power derating curve 44 of PV inverter 12, is initiated to prevent overheating and failure of PV inverter 12. This output power regulation. As shown, the PV inverter controller 18 regulates the inverter output power as the PV voltage increases and shuts down PV inverter 12 completely when the PV voltage reaches the maximum operating voltage threshold of PV inverter 12.

Figure 3:
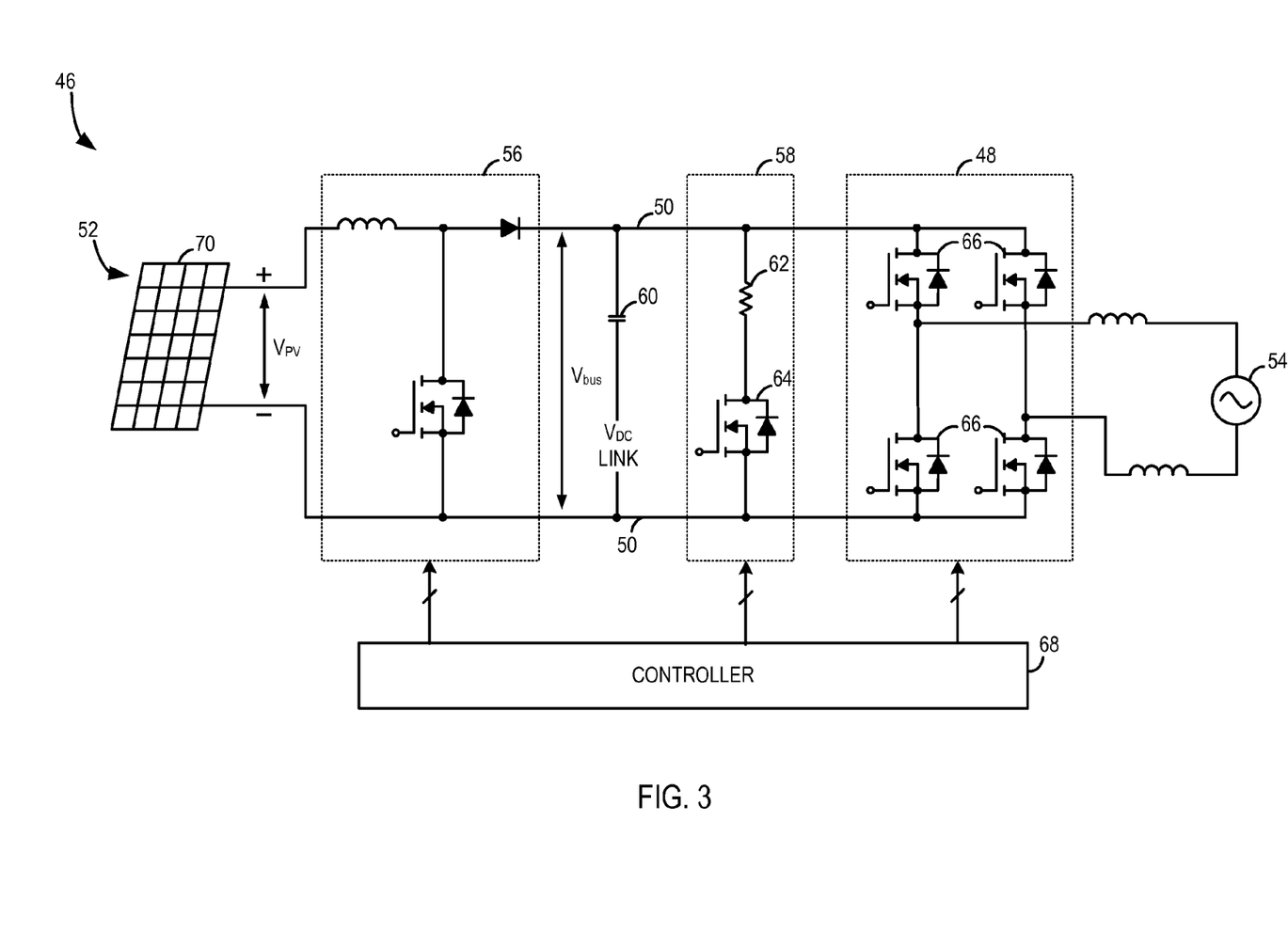
FIG. 3 is a schematic illustration of a photovoltaic system according to an embodiment of the invention.

Referring now to FIG. 3, a photovoltaic system 46 is shown according to an embodiment of the invention. Photovoltaic system 46 employs a PV inverter 48 (e.g., a DC-to-AC power inverter) to control the voltage on DC bus or DC link 50 and convert a DC bus voltage received from a PV array assembly 52 to a fixed frequency AC current for a power grid 54. In one embodiment, a DC-to-DC converter or boost circuit 56 is provided between PV array assembly 52 and PV inverter 48 to selectively boost the output voltage of the PV array assembly 52 to a desired DC bus voltage. A damping circuit 58 is coupled between a bus capacitor 60 and PV inverter 48, as shown. Damping circuit 58 includes a damping resistor 62 and a damping switch 64. According to various embodiments, damping switch 64 may be a contactor, diode, relay, IGBT, SCR, or other switching device. While damping circuit 58 is described herein as including a damping resistor 62, the damping circuit 58 may include alternative devices that absorb surplus power from PV array assembly 52.

PV inverter 48 includes a set of switches 66 that convert the DC power from PV array assembly 52 to AC power for a load, such as the power grid 54. The set of switches 66 may be in the form of any of a number of various switching elements or devices, including a relay, an IGBT, an SCR, a circuit breaker, sub-arrays of small contactors, or other suitable switching devices. In operation, the set of switches 66 function to selectively regulate the effective operating voltage of PV array assembly 52 to PV inverter 48, as described in more detail below. According to various embodiments of the invention, photovoltaic system 46 may also include any number of additional components (not shown) such as, for example, filters, fuses, contactors, circuit breakers, and/or transformers coupled between PV inverter 48 and power grid 54.

A controller 68 is provided in photovoltaic system 46 to control actuation/switching of boost circuit 56, damping circuit 58, the set of switches 66 and the corresponding amount/level of voltage provided from PV array assembly 52 to PV inverter 48. According to embodiments of the invention, controller 68 may be in the form of separate dedicated controllers for each component or as a multi-function controller assembly that controls functions of PV inverter, boost circuit 56, and damping circuit 58.

While PV array assembly 52 of photovoltaic system 46 is shown having only one PV array 70, it is contemplated that the number of PV arrays in photovoltaic system 46 can vary, with two, three, four or more PV arrays 70 being included in photovoltaic system 46, for example, with each PV array 70 being configured to generate a DC power responsive to received solar radiation. Each PV array 70 is composed of a plurality of PV strings (not shown) connected in parallel, with each of the PV strings including a plurality of modules (not shown) therein that are connected in series to generate a DC power.

Figure 4:
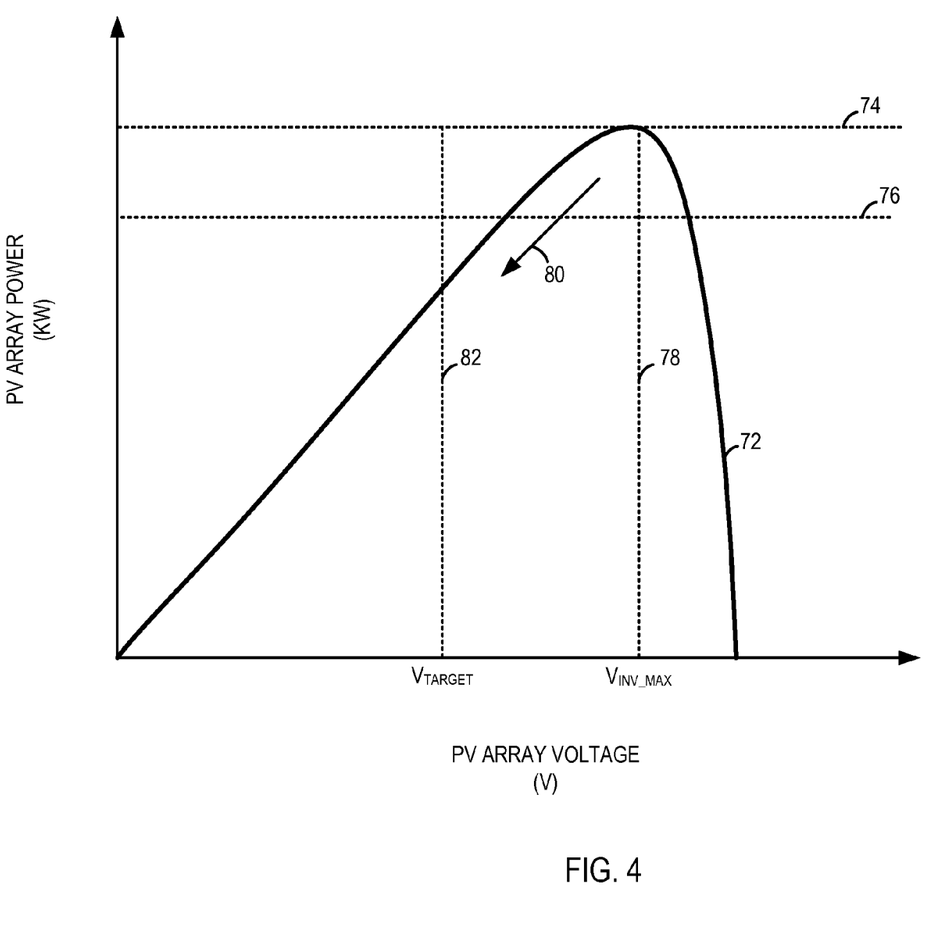
FIG. 4 is a graph illustrating the operating voltage and output power of a photovoltaic array of the photovoltaic system of FIG. 3.

FIG. 4 is a graph illustrating an operating characteristic of PV array assembly 52 of FIG. 3, as described by a power v. voltage curve 72. PV array assembly 52 operates to output an array power (kW), as indicated along the y-axis, as a function of its array voltage (V), indicated along the x-axis. As shown, the maximum output power of PV array assembly 52, indicated by dashed line 74, is greater than the maximum power of PV inverter 48, indicated by dashed line 76.

Referring now to FIG. 3 and FIG. 4 together, in operation controller 68 monitors the voltage of PV array assembly 52. If the PV voltage is above a maximum operating voltage threshold, $V_{INV\_MAX}$, for safe operation of PV inverter 48 (e.g., 500 V), indicated by dashed line 78, damping switch 64 is closed to pass the current from bus capacitor 60 through damping resistor 62. When damping switch 64 is closed or activated, damping circuit 58 drags the voltage of PV array assembly 52 down, as indicated by arrow 80, as power is dissipated in damping resistor 62. One skilled in the art will recognize that damping resistor 62 may be selected to have a resistance to achieve a desired power dissipation in photovoltaic system 46. Damping circuit 58 remains active until the PV voltage reaches a target voltage (e.g., 300 V), indicated by dashed line 82, at which the set of switches 66 of PV inverter 48 can safely operate. Once the voltage reaches the target voltage, the damping switch 64 is opened and PV inverter 48 starts to invert panel power to power grid 54 as normal.

Figure 5:
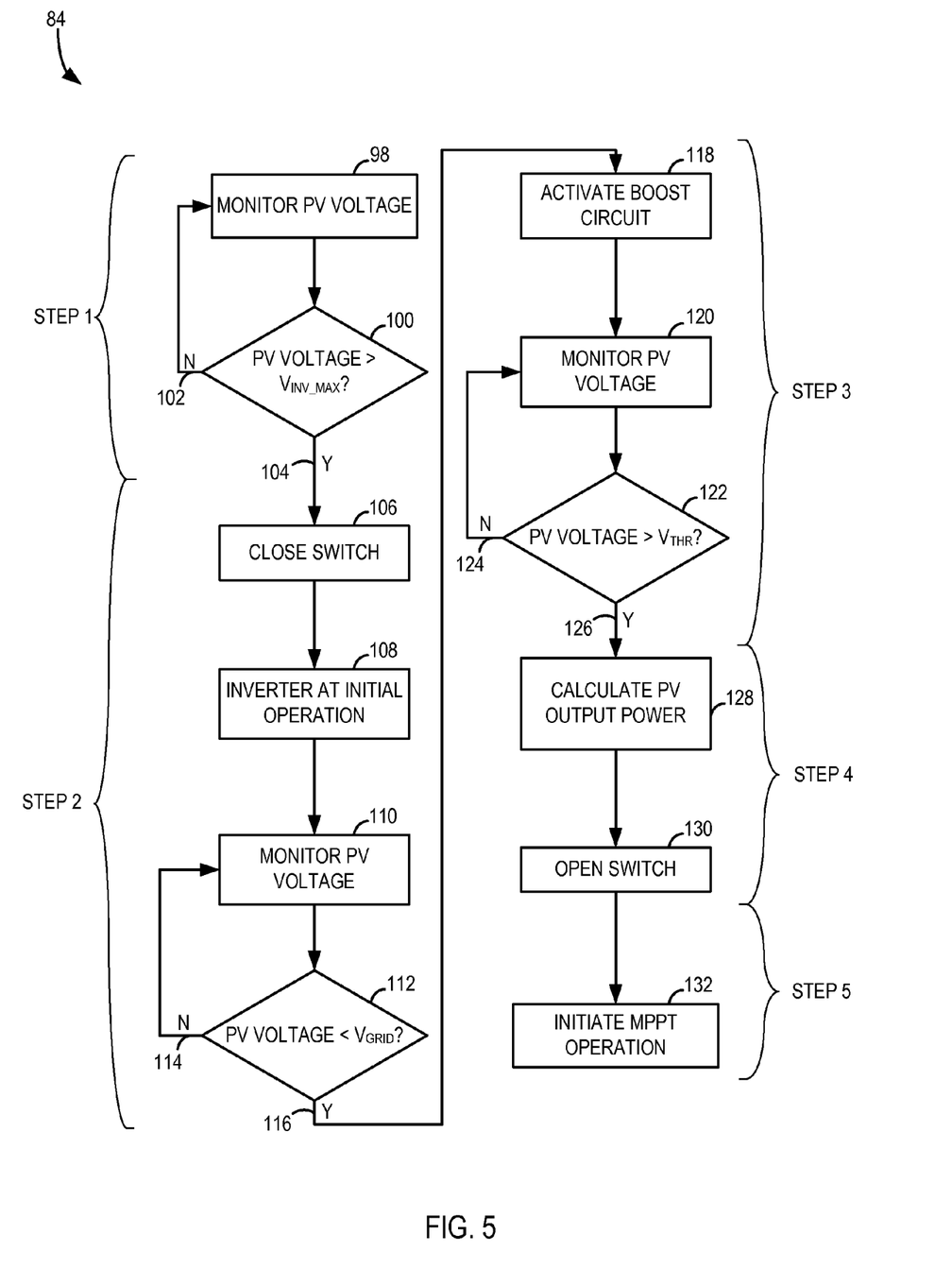
FIG. 5 is a flowchart illustrating a technique for controlling the photovoltaic system of FIG. 3, according to an embodiment of the invention.
Figure 6:
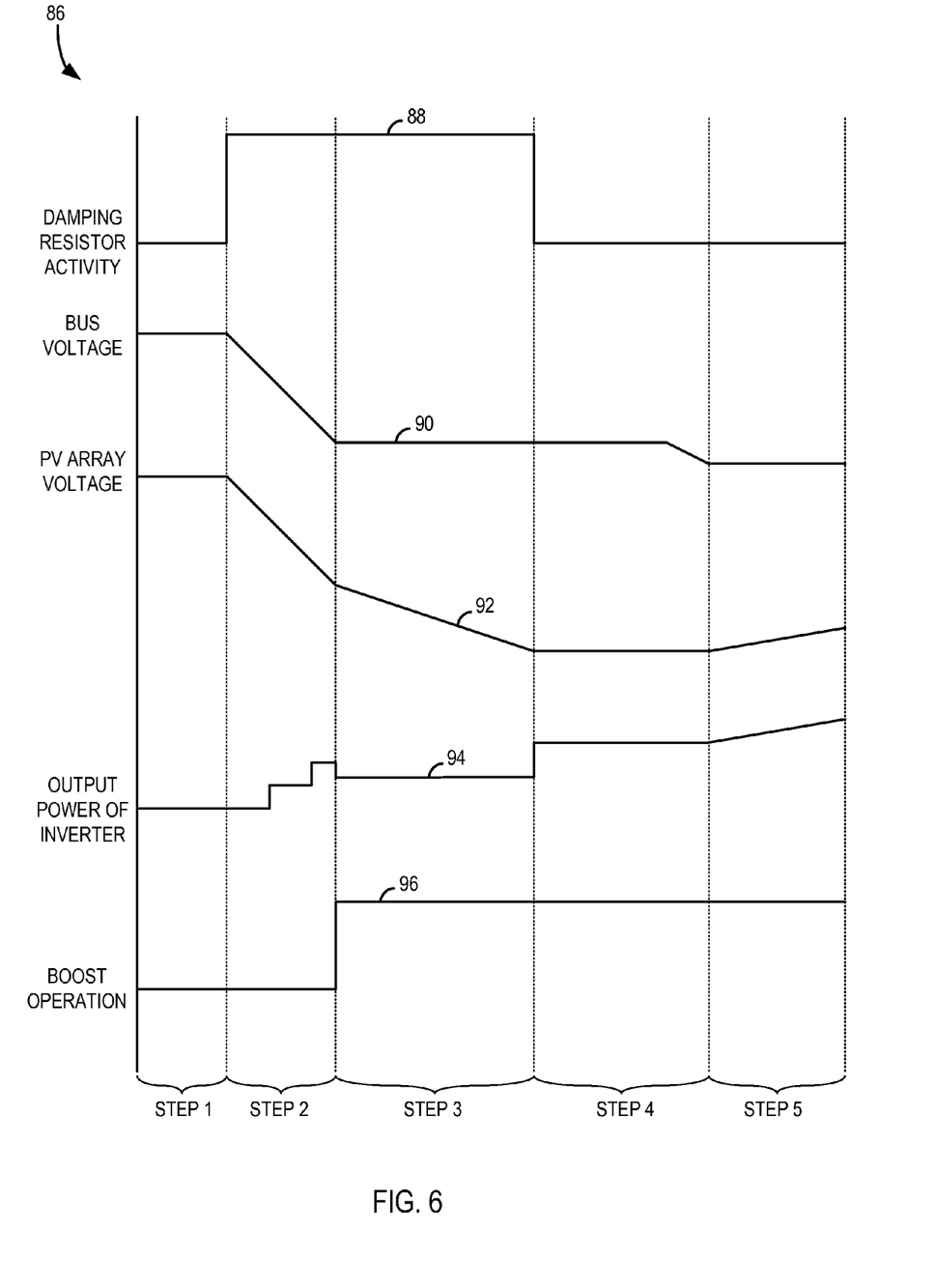
FIG. 6 is series of graphs illustrating operating characteristics of a photovoltaic system operated in accordance with the technique of FIG. 5.

In order to maintain stable operation, controller 68 selectively controls operation of boost circuit 56 and PV inverter 48 while damping circuit 58 is being operated to drag the PV array voltage down to the target voltage, as described in more detail with respect to FIGS. 5 and 6. FIG. 5 is a flowchart illustrating a damping control sequence technique 84 for controlling photovoltaic system 46. FIG. 6 is a series of graphs 86 illustrating operating characteristics of damping resistor 62, DC link 50, PV array assembly 52, PV inverter 48, and boost circuit 56. In particular, FIG. 6 includes a graph 88 illustrating the activity of damping resistor 62, a graph 90 of the voltage of DC link 50, a graph 92 of the voltage of PV array assembly 52, a graph 94 of the output power of PV inverter 48, and a graph 96 illustrating the operation of boost circuit 56.

Step 1 of technique 84 begins at BLOCK 98 by monitoring the output voltage of PV array assembly 52. At BLOCK 100, technique 84 determines whether the voltage is above the maximum operating voltage threshold ($V_{INV\_MAX}$) of PV inverter 48 and thus is high enough to begin the damping control sequence. If the PV voltage is below the maximum operating voltage threshold 102, photovoltaic system 46 controls PV inverter 48 to invert the output of PV array assembly 52 according to a conventional startup technique. Technique 84 also continues monitoring the PV voltage at BLOCK 98. If the PV voltage is above the maximum operating voltage threshold 104, technique 84 initiates Step 2 of the damping control sequence by closing damping switch 64 at BLOCK 106 to activate damping circuit 58 and drag the output voltage of PV array assembly 52 down. As the voltage of PV array assembly 52 declines, PV inverter 48 begins to invert a small amount of power to power grid 54 at BLOCK 108, as shown in graph 94, in order to prevent equality between the power generated by PV array assembly 52 and the power consumed by damping resistor 62.

At BLOCK 110, technique 84 again monitors the PV voltage and determines whether the PV voltage has been dragged down to the peak voltage of power grid 54 ($V_{GRID}$) at BLOCK 112. If not 114, technique 84 continues to monitor the PV voltage while damping resistor 62 further drags down the PV voltage. If the PV voltage has reached the peak voltage 116 of power grid 54, technique 84 enters Step 3 of the damp control sequence. At BLOCK 118 the boost circuit 56 is activated so the voltage of PV array assembly 52 is permitted to continue decreasing. Absent activation of boost circuit 56 at BLOCK 118, the voltage of PV array assembly 52 would maintain the same voltage level as DC link 50 and be charged by reverse current from power grid 54. As shown in FIG. 6, during Step 3, the voltage of PV array assembly 52 continues to decrease while the voltage of DC link 50 holds steady and PV inverter 48 continues inverting a small amount of power to power grid 54.

Technique 84 monitors the voltage of PV array assembly 52 at BLOCK 120. At BLOCK 122, technique 84 determines if the voltage has reached a threshold voltage ($V_{THR}$) slightly above the target voltage ($V_{TARGET}$) for initiating operation of PV inverter 48. If not 124, technique 84 returns to BLOCK 120 and continues to monitor voltage. If the voltage of PV array assembly 52 has reached the threshold voltage 126, technique 84 enters Step 4 of the damping control sequence and beings to calculate the average output power of PV array assembly 52. Before the deactivation of damping circuit, technique 84 also estimates the amplitude of the output AC current, $I_{GRID}$, according to:

$$I_{GRID} = P_{PV(AVG)} / V_{AC\_GRID(AVG)} \qquad \text{(Equ. 1)},$$

where $P_{PV(AVG)}$ is the average output power of PV array assembly 52 and $V_{AC\_GRID(AVG)}$ is the average AC voltage of power grid 54.

At BLOCK 130 switch 64 is opened and photovoltaic system 46 commands PV inverter 48 to invert the calculated power to power grid 54 for a number of initial switching cycles to stabilize the voltage in DC link 50 between the damping circuit activation and deactivation.

After PV inverter 48 beings inverting the calculated power to power grid 16, technique 84 enters Step 5 and PV inverter 48 begins to track the maximum power point of PV array assembly 52 at BLOCK 132. That is, controller 68 is programmed to implement a maximum power point tracking (MPPT) algorithm in photovoltaic system to extract the maximum possible available power from PV array assembly 52 by dynamic loading of the PV array 70 to obtain maximum power for any given environmental conditions. In one embodiment, PV inverter 48 functions to control the voltage on DC link 50, according to the MPPT control instituted by the array power algorithm based on the desired or required power to be output from photovoltaic system 46, and defines the current that PV inverter 48 should draw from PV array assembly 52 in order to get the maximum possible power (since power equals voltage times current) for photovoltaic system 46. During MPPT, controller 68 continuously monitors the DC voltage generated by and output from PV array assembly 52 as well as the output of PV inverter 48 and adjusts the switching of the set of switches 66 so as to maximize the power output to power grid 54 according to the MPPT algorithm.

According to one embodiment of the invention, varied duty control may be used in conjunction the damping control sequence to enhance the stability of the system startup. A technique 134 for varied duty control is set forth in FIG. 7. FIG. 8 includes a series of graphs 136 illustrating a number of system parameters associated with varied duty control technique 134, including monitored bus voltage 138, varied duty control of damping switch 140, and inverter output 142.

Figure 7:
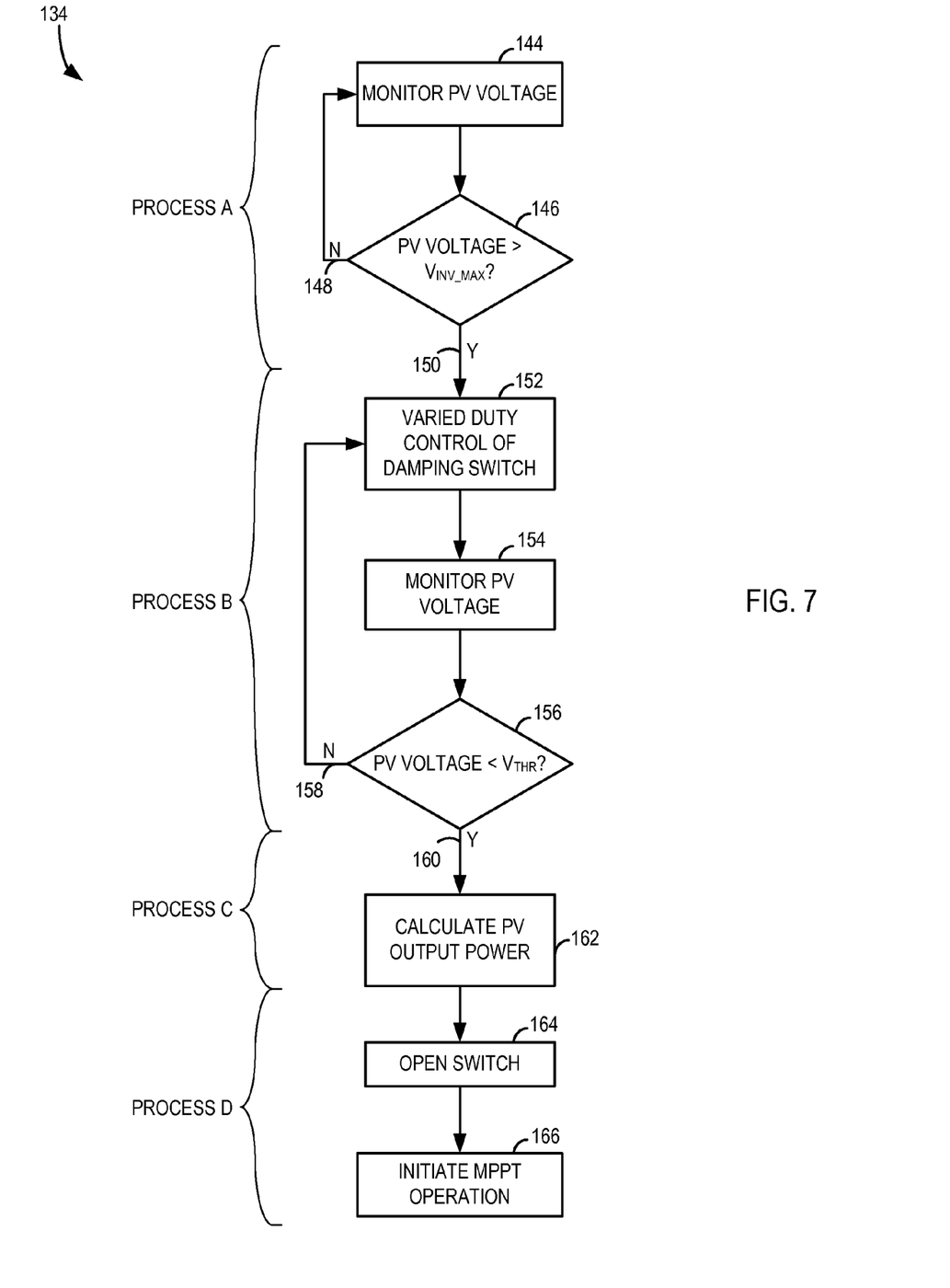
FIG. 7 is a flowchart illustrating a startup technique for use with the photovoltaic system of FIG. 3, according to an embodiment of the invention.
Figure 8:
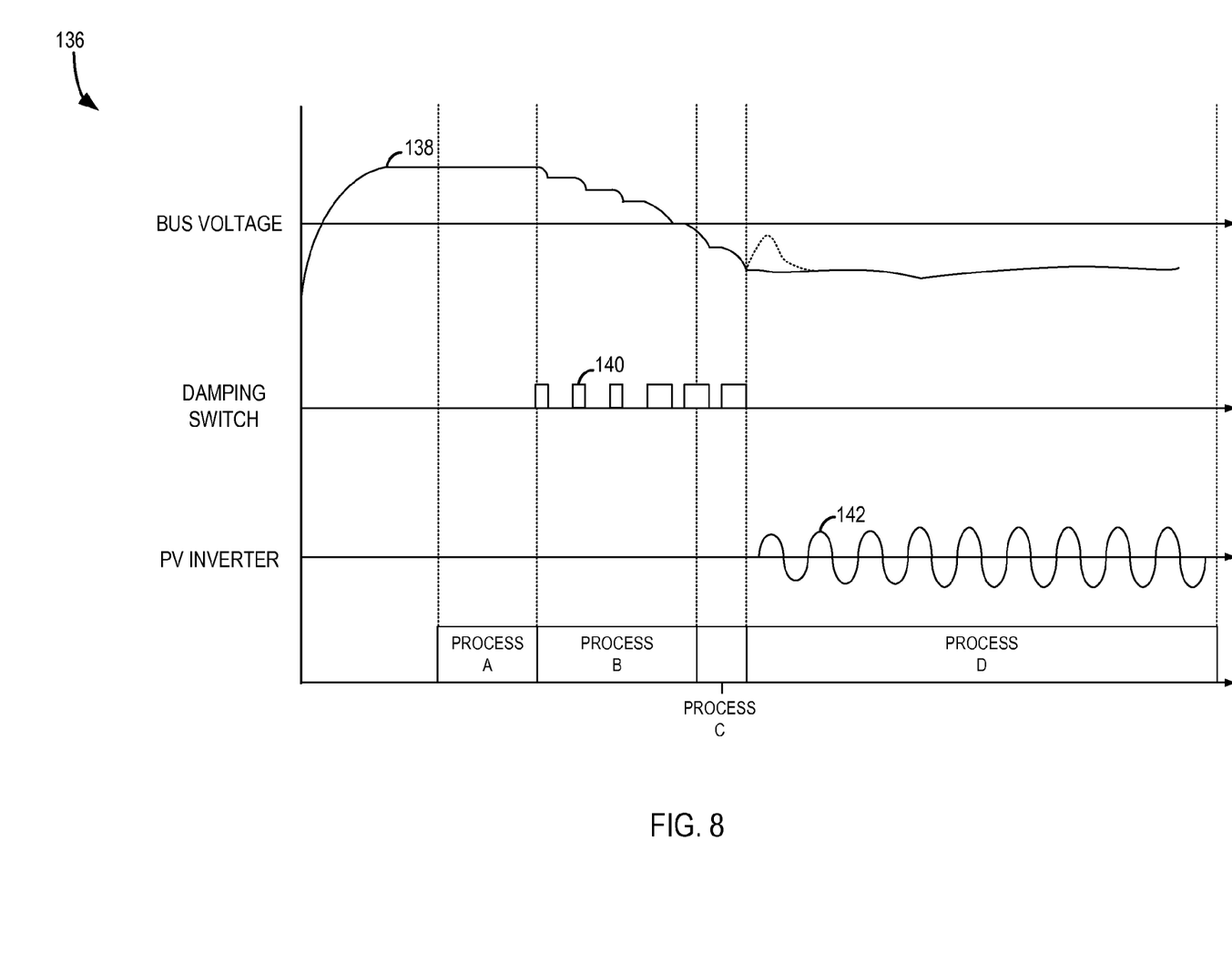
FIG. 8 is a series of graphs illustrating operating characteristics of a photovoltaic system operated in accordance with the startup technique of FIG. 7.

Referring now to FIG. 7 and FIG. 8, Process A of technique 134 begins at BLOCK 144 by monitoring the voltage of PV array assembly 52. At BLOCK 146, technique 134 determines whether the monitored voltage is above a predetermined maximum operating voltage threshold, $V_{INV\_MAX}$, of PV inverter 48. If not 148, varied duty control technique 134 returns to BLOCK 144. If the monitored voltage is above the predetermined threshold 150, technique 134 initiates Process B of the varied duty control technique 134 and begins varied duty control of damping switch 64 at BLOCK 152.

During Process B, the duty of damping circuit 58 continues to increase while the voltage of photovoltaic system 46 is monitored at BLOCK 154. According to various embodiments, the monitored voltage may be the bus voltage and/or output voltage of PV array assembly 52. As shown in graphs 138, 140 of FIG. 8, the switching of damping switch 64 continues to incrementally increase from a duty of 10% to 100% as the monitored voltage drops to a threshold voltage for startup of PV inverter 48.

At BLOCK 156, technique 134 determines whether the monitored voltage is below a predetermined threshold voltage, $V_{THR}$, for initiating operation of PV inverter 48. If not 158, varied duty control technique 134 continues the varied duty control of switch 64 (BLOCK 152) and monitors voltage at BLOCK 154. If the monitored voltage is below the threshold voltage 160, varied duty control technique 134 enters Process C of the startup sequence and calculates the average output power of PV array 52. at BLOCK 162. Before the deactivation of damping circuit, varied duty control technique 134 also estimates the amplitude of the output AC current, $I_{GRID}$, according to:

$$I_{GRID} = P_{PV(AVG)} / V_{AC\_GRID(AVG)} \quad \text{(Equ. 2)},$$

where $P_{PV(AVG)}$ is the average output power of PV array assembly 52 and $V_{AC\_GRID(AVG)}$ is the average AC voltage of power grid 54.

At BLOCK 164 damping circuit 58 is deactivated by opening damping switch 64 and photovoltaic system 46 commands PV inverter 48 to invert the calculated power to power grid 54 for the voltage stabilization of DC link 50. After PV inverter 48 beings inverting the calculated power to power grid 16, technique 84 enters Process D of varied duty control technique 134 and PV inverter 48 begins to track the maximum power point of PV array assembly 52 at BLOCK 166.

The damping control sequence described with respect to FIGS. 5-8 provides voltage protection for PV inverter 48 during initiation of DC/AC operation of PV inverter 48. However, an increase in the output power of PV array assembly 52 during operation of PV inverter 48 due to, for example, a decrease in the ambient temperature surrounding PV array assembly 52, may also drive PV inverter 48 into voltage protection mode.

Figure 9:
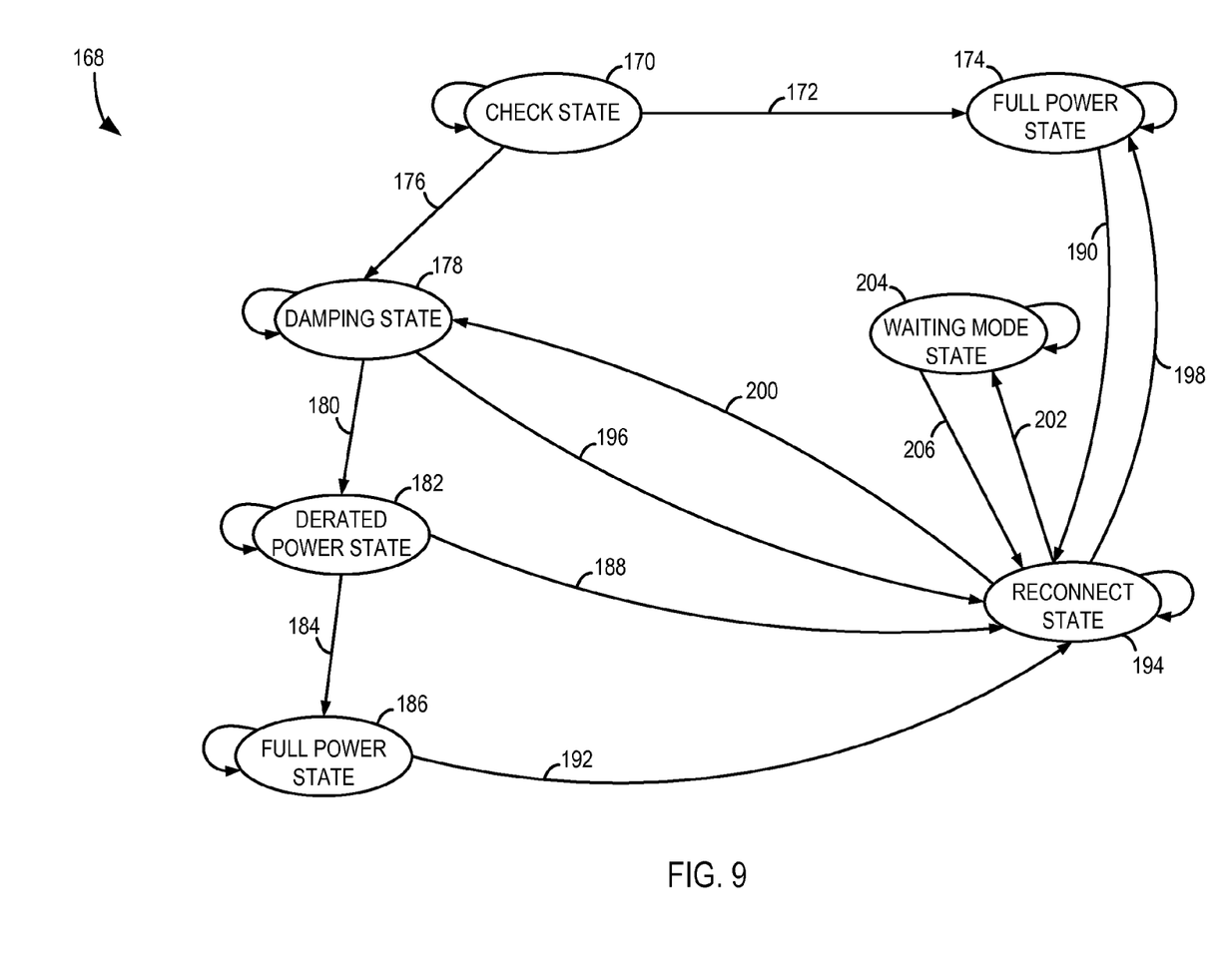
FIG. 9 is a state-flow diagram of a control sequence for a photovoltaic inverter of the photovoltaic system of FIG. 3, according to an embodiment of the invention.

FIG. 9 illustrates a state-flow diagram 168 that represents a method of operating PV inverter 48 of photovoltaic system 46 in connection with damping circuit 58 to maintain a maximum chance of maintaining DC/AC operation of PV inverter 48 when the output power of PV array assembly 52 rises above a maximum power of PV inverter 48 (i.e., an overvoltage condition).

Referring now to FIG. 9, and with continued reference to the photovoltaic system 46 of FIG. 3, photovoltaic system 46 monitors the stability of power grid 54 at a check state 170. The check state 170 is maintained until the expiration of a predetermined period of time (e.g., 30 seconds). At the end of the check state 170, photovoltaic system 46 checks the output voltage of PV array assembly 52. If the photovoltaic system 46 determines that the output voltage of PV array assembly 52 is less than the maximum operating voltage threshold for PV inverter 48 at the expiration of the check state 170, a transition 172 will occur to a full power state 174. During operation in full power state 174, controller 68 controls switching of PV inverter 48 to operate according to an MPPT algorithm and fully invert maximum power to power grid 54.

If, on the other hand, the output voltage of PV array assembly 52 is greater than the maximum operating voltage threshold for PV inverter 48, a transition 176 will occur to a damping state 178 in which damping switch 64 is closed and damping circuit 58 operates to drag down the voltage of PV array assembly 52, as described with respect to FIG. 5 and FIG. 6, in order to permit initiation of DC/AC operation of PV inverter 48.

After DC/AC operation of PV inverter 48 is successfully initiated at state 178, a transition 180 will occur to a MPPT with derated power state 182 if the voltage of PV array assembly 52 is below a predetermined lower DC link voltage threshold. In one embodiment, the predetermined threshold DC link voltage is 200 volts below the maximum operating voltage threshold for PV inverter 48, $V_{INV\_MAX}$. In derated power state 182, PV inverter 48 operates at a state of MPPT with derated power. For example, photovoltaic system 46 may limit its output power to be below 90% of the maximum power of PV inverter 48. After derated power state 182 has run successfully for a predetermined period of time, such as, for example, 10 minutes, a transition 184 occurs to a full power state 186. In full power state 186, photovoltaic system 46 operates according to an MPPT algorithm and fully invert maximum power to power grid 54, in a similar manner as full power state 174 described above.

If while operating in derated power state 182, full power state 174, or full power state 186, the bus voltage exceeds a predetermined upper DC link voltage threshold, such as, for example, 515 V, respective transitions 188, 190, 192 will occur to a reconnect mode state 194. A transition 196 to reconnect mode state 194 also occurs while operating in damping state 178 if the PV array voltage remains above the predetermined upper DC link voltage threshold after operating in damping state 178 for a predetermined time. For example, in one embodiment the transition 196 will occur if the PV array voltage is greater than $V_{INV\_MAX}$–200 Volts after 600 ms.

During reconnect state 194, photovoltaic system 46 enters voltage protection mode. Upon entering reconnect state 194, a timing countdown is initiated. When the countdown is completed, photovoltaic system 46 checks the voltage of PV array assembly 52 and decides which state to enter next. If, after completion of the timing countdown, the voltage of PV array assembly 52 is less than a maximum operating voltage of PV inverter 48, a transition 198 occurs to full power state 174. If, on the other hand, the voltage of PV array assembly 52 is greater than the maximum operating voltage after the timing countdown is complete, a transition 200 occurs to damping state 178.

Repeatedly entering reconnect mode state 194 implies that the output power of PV array assembly 52 has caused PV inverter 48 to continuously fall into reconnect mode state 194 during operation. Thus, if photovoltaic system 46 enters reconnect mode state 194 more than a predetermined number of times, photovoltaic system 46 follows a transition 202 to a waiting mode state 204 to stand by. In one embodiment, waiting mode state 204 is triggered if the photovoltaic system 46 has entered reconnect mode state 194 three (3) times. Waiting mode state 204 is maintained until either the open voltage is maintained below a threshold (e.g., 515 V) for a length of time (e.g., 10 minutes) or the photovoltaic system 46 has run in waiting mode state 204 for a predetermined length of time (e.g., 1 hour) after which a lower PV array power may be assumed. At the expiration of waiting mode state 204, a transition 206 is made to reconnect mode state 194.

A technical contribution for the disclosed method and apparatus is that it provides for a controller implemented technique for operating a damping circuit. The controller monitors an output voltage of the PV array and selectively operates a damping switch based on the monitored output voltage of the PV array.

Therefore, according to one embodiment of the present invention, a photovoltaic (PV) system includes a PV array configured to generate a direct current (DC) output from received solar radiation and a DC link coupled to the PV array to receive the DC output therefrom. The PV system also includes a DC-to-AC power inverter electrically coupled to the DC link to receive the DC output therefrom and invert the DC output to an AC output and a damping circuit electrically coupled to the DC link and positioned between the PV array and the DC-to-AC power inverter. The damping circuit includes a damping resistor and a damping switch.

According to another embodiment of present invention, method of operating a photovoltaic (PV) system includes monitoring an output voltage of a PV array and determining whether the monitored output voltage of the PV array is above the maximum operating voltage of a PV inverter. If the monitored output voltage of the PV array is above the maximum operating voltage of the PV inverter, the method includes the steps of: activating a damping circuit to reduce the output voltage of the PV array to a first predetermined threshold, the damping circuit comprising a damping resistor and a damping switch; and determining whether the monitored output voltage of the PV array is below the first predetermined threshold. If the monitored output voltage of the PV array is below the first predetermined threshold, the method includes the step of deactivating the damping circuit.

According to yet another embodiment of the present invention, a photovoltaic (PV) system includes a PV inverter, a DC link electrically coupled to the PV inverter and configured to operate at a DC link voltage, and a PV array connected to the DC link. The PV system also includes a damping circuit coupled between the PV array and the PV inverter. The damping circuit includes a damping resistor and a damping switch. Further, the PV system includes a controller programmed to monitor an output voltage of the PV array; and selectively operate the damping switch based on the monitored output voltage of the PV array.

The present invention has been described in terms of the preferred embodiment, and it is recognized that equivalents, alternatives, and modifications, aside from those expressly stated, are possible and within the scope of the appending claims.

What is claimed is:

1. A photovoltaic (PV) system comprising:
   a PV array configured to generate a direct current (DC) output from received solar radiation;
   a DC link coupled to the PV array to receive the DC output therefrom;
   a DC-to-AC power inverter electrically coupled to the DC link to receive the DC output therefrom and invert the DC output to an AC output; and
   a damping circuit electrically coupled to the DC link and positioned between the PV array and the DC-to-AC power inverter, the damping circuit comprising a damping resistor and a damping switch.

2. The PV system of claim 1 further comprising a controller configured to selectively operate the damping switch.

3. The PV system of claim 2 wherein the controller is further configured to:
   determine an output voltage of the PV array; and
   selectively operate the damping switch to lower the output voltage of the PV array to a pre-determined voltage threshold.

4. The PV system of claim 3 wherein the controller is further configured to selectively operate the damping switch according to a varied duty cycle.

5. The PV system of claim 3 wherein the controller is further configured to:
   determine if the output voltage of the PV array is greater than a maximum DC-to-AC power inverter voltage threshold; and
   if the voltage output of the PV array is greater than the maximum DC-to-AC power inverter voltage threshold, then close the damping switch to lower the output voltage of the PV array;
   otherwise, open the damping switch and selectively operate the DC-to-AC power inverter to invert the DC output from the PV array to an AC output.

6. The PV system of claim 2 wherein the controller is further configured to operate the DC-to-AC power inverter according to a maximum power point tracking (MPPT) algorithm.

7. The PV system of claim 6 wherein the controller is further configured to:
   operate the DC-to-AC power inverter at a derated power for a first time period; and
   after expiration of the first time period, operate the DC-to-AC power inverter at a maximum inverter power.

8. The PV system of claim 1 further comprising a DC-to-DC voltage converter coupled to the PV array and the DC link.

9. A method of operating a photovoltaic (PV) system comprising:
   monitoring an output voltage of a PV array;
   determining whether the monitored output voltage of the PV array is above a maximum operating voltage of a PV inverter;
   if the monitored output voltage of the PV array is above the maximum operating voltage of the PV inverter, activating a damping circuit to reduce the output voltage of the PV array to a first predetermined threshold, the damping circuit comprising a damping resistor and a damping switch;
   determining whether the monitored output voltage of the PV array is below the first predetermined threshold; and
   if the monitored output voltage of the PV array is below the first predetermined threshold, deactivating the damping circuit.

10. The method of operating a PV system of claim 9 further comprising:
    determining whether the monitored output voltage of the PV array is below a peak voltage of a power grid; and
    if the monitored output voltage of the PV array is below the peak voltage of the power grid, activating a DC-to-DC boost circuit.

11. The method of operating a PV system of claim 9 further comprising activating the damping circuit according to a varied duty cycle.

12. The method of operating a PV system of claim 9 further comprising:
    determining whether the monitored output voltage of the PV array is below a target voltage; and
    deactivating the damping circuit if the monitored output voltage of the PV array is below the target voltage.

13. The method of operating a PV system of claim 12 further comprising:
    calculating an average output power of PV array prior to deactivating the damping circuit; and
    estimating an amplitude of an output AC current according to:

$$I_{GRID} = P_{PV(AVG)} / V_{AC\_GRID(AVG)}$$

where $P_{PV(AVG)}$ is an average output power of the PV array and $V_{AC\_GRID(AVG)}$ is an average AC voltage of a power grid.

14. The method operating a PV system of claim 13 further comprising controlling the PV inverter to invert the calculated average output power to the power grid during a number of initial switching cycles to stabilize a DC bus voltage after deactivating the damping circuit.

15. The method of operating a PV system of claim 12 further comprising operating the PV inverter according to a maximum power point tracking (MPPT) algorithm.

16. A photovoltaic (PV) system comprising:
   a PV inverter;
   a DC link electrically coupled to the PV inverter and configured to operate at a DC link voltage;
   a PV array connected to the DC link;
   a damping circuit coupled between the PV array and the PV inverter, the damping circuit comprising a damping resistor and a damping switch; and
   a controller programmed to:
      monitor an output voltage of the PV array; and
      selectively operate the damping switch based on the monitored output voltage of the PV array.

17. The PV system of claim 16 wherein the controller is programmed to:
   determine if the output voltage of the PV array is above a first threshold; and
   if the output voltage of the PV array is above the first threshold, close the damping switch.

18. The PV system of claim 16 wherein the controller is programmed to:
   determine if the output voltage of the PV array is below a second threshold, the second threshold lower than the first threshold; and
   if the output voltage of the PV array is below the second threshold, open the damping switch and selectively operate the PV inverter to invert a DC output of the PV array to an AC output according to a maximum power point tracking (MPPT) algorithm.

19. The PV system of claim 16 wherein the controller is programmed to control switching of the damping switch according to a varied duty cycle.

20. The PV system of claim 16 wherein the controller is programmed to:
   operate the PV inverter according to a MPPT algorithm;
   monitor the DC link voltage during operation of the PV inverter; and
   if the monitored DC link voltage is above a DC link voltage threshold:
      initiate a timing countdown;
      monitor the DC link voltage after expiration of the timing countdown; and
      enter one of a damping state, a full power state, and a derated power state based on the monitored DC link voltage after expiration of the timing countdown.

21. The PV system of claim 20 wherein the controller is programmed to:
   count a number of times the PV system has entered the damping state; and
   if the number of times equals a threshold number, enter a standby mode.

22. The PV system of claim 16 further comprising a DC-to-DC boost converter coupled to the DC link.

* * * * *